United States Patent [19]

Lakoski et al.

[11] Patent Number: 4,964,285
[45] Date of Patent: Oct. 23, 1990

[54] COMPUTER DRIVE BEZEL ATTACHMENT

[75] Inventors: Robert P. Lakoski, Austin, Tex.; Jody L. Numbers, Tempe, Ariz.

[73] Assignee: Lama Systems Inc., Austin, Tex.

[21] Appl. No.: 268,283

[22] Filed: Nov. 7, 1988

[51] Int. Cl.$^5$ .............................................. E05B 73/00
[52] U.S. Cl. .................................... 70/14; 70/58; 70/158
[58] Field of Search ................ 70/14, 57, 58, 158-173

[56] References Cited

U.S. PATENT DOCUMENTS

| | | |
|---|---|---|
| 452,903 | 5/1891 | Cosman . |
| 979,167 | 12/1910 | Hutchinson . |
| 1,789,756 | 1/1931 | Jacobi . |
| 3,096,409 | 6/1960 | Hubbell . |
| 3,131,985 | 5/1964 | Blonder . |
| 3,475,929 | 11/1969 | Weingart . |
| 3,888,096 | 6/1975 | Huss . |
| 4,031,722 | 6/1977 | Michelman . |
| 4,131,001 | 12/1978 | Gotto . |
| 4,169,619 | 10/1979 | McCracken . |
| 4,248,069 | 2/1981 | Burbank . |
| 4,326,394 | 4/1982 | Stein . |
| 4,462,233 | 7/1984 | Horetzke . |
| 4,527,405 | 7/1985 | Renick . |
| 4,593,341 | 6/1986 | Hollis . |
| 4,640,106 | 7/1987 | Derman . |
| 4,655,057 | 4/1987 | Derman . |
| 4,685,312 | 8/1987 | Lakoski . |
| 4,773,243 | 9/1988 | Lukich . |

FOREIGN PATENT DOCUMENTS 8105741 12/1981 Netherlands .
2131219 6/1984 United Kingdom .

Primary Examiner—Alexander Grosz
Assistant Examiner—Suzanne L. Dino
Attorney, Agent, or Firm—Leydig, Voit & Mayer

[57] ABSTRACT

A computer disk drive slot blocking device for permanent mounting on the computer featuring a rotatable blocking element associated with a base for attachment to be the computer and a housing containing a lock plug where insertion of the key into the lock plug allows the blocking element to be rotated between a slot blocking and slot unblocking positions.

7 Claims, 1 Drawing Sheet

U.S. Patent    Oct. 23, 1990    4,964,285
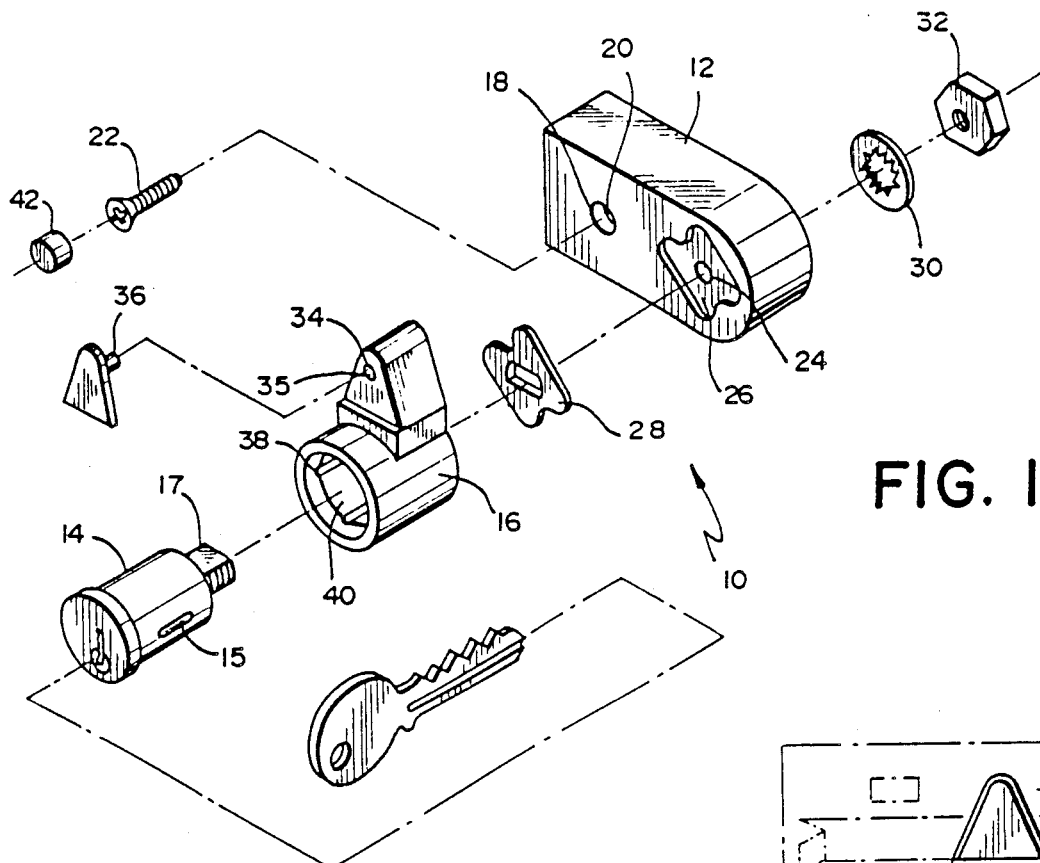
FIG. 1
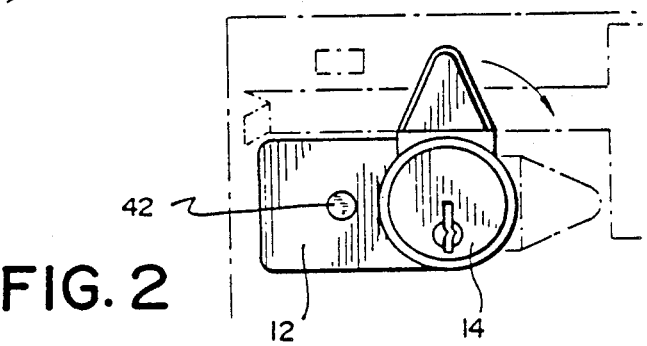
FIG. 2
FIG. 3
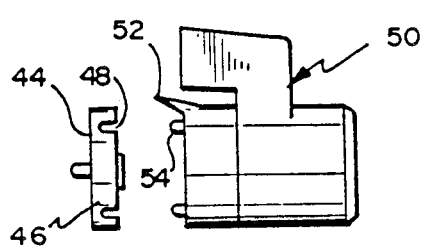
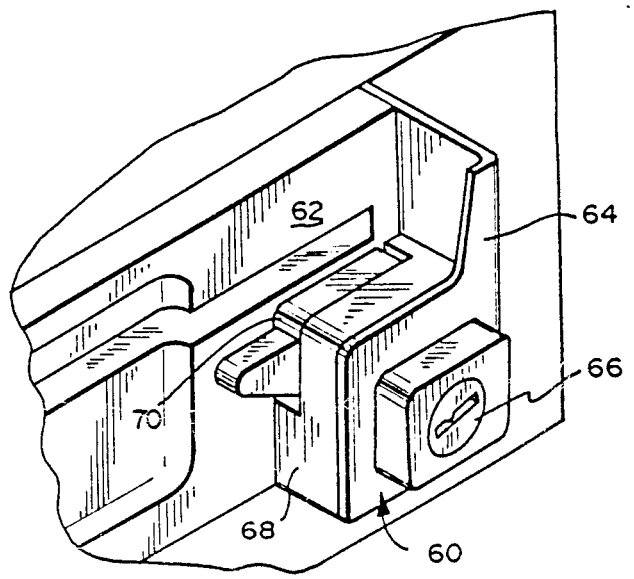
FIG. 4

COMPUTER DRIVE BEZEL ATTACHMENT

TECHNICAL FIELD

This invention relates to a computer diskette drive blocking device and, more particularly, to a rotatable blocking device configured for attachment to a computer in close proximity to the diskette drive.

BACKGROUND OF THE INVENTION

The presence and use of personal computers in all phases of business and the home is now well established. Also, now well established are a myriad of problems ranging from vandalism, including the introduction of computer viruses into computer operating systems and programs, to theft or alteration of sensitive business information and data. Great damage occurs when diskettes containing sensitive data, both business and personal, are compromised. This need occasioned the introduction of physical security adjuncts such as internal locking systems and external disk drive locking devices such as that embodied in U.S. Letters Pat. No. 4,685,312, owned by Applicant.

SUMMARY OF THE INVENTION

It is an object of this invention to provide an externally mountable blocking device to block an external computer data drive.

It is another object of this invention to provide a retrofittable blocking device capable of mounting proximate to the data drive slot and capable of being rotated between a slot blocking position and an unblocking position.

Still another object of this invention is to provide a blocking means that can be permanently mounted to a computer drive face by mechanical and solvent/adhesive attachment.

Another object of this invention is to provide a blocking attachment for a computer bezel which is adapted to customized mounting in a desired position on the bezel.

Yet another object of this invention is to provide a computer diskette drive blocking attachment which possesses features to permit mounting with solvent/adhesive and a screw which can be tailored to conform to the particular drive face configuration.

These and other objects are satisfied by a device for attachment to a computer having a drive aperture, comprising:

(a) a housing, (b) a lock plug with retractable pins partially journalled within said housing, said lock plug and housing being rotatable relative to each other, (c) a base for mounting directly on the computer, said base having an aperture extending therethrough, (d) at least one attachment means for attaching said base to the computer by extending through said aperture and into the computer, (e) a rotatable blocking means for blocking said drive aperture being rotatable relative to said base and capable of movement between a drive aperture blocking position and an unblocking position, (f) whereupon rotating one of said housing and said lock plug relative to one another permits said blocking means to rotate relative to said base between said blocking position and said unblocking position.

Still other objects of the invention are satisfied by a method for retrofitting a blocking device for computer data drive access aperture, comprising the steps of:

selecting a solvent capable of dissolving the thermoplastic composition of the computer data drive, forming a housing containing a key-actuated lock plug where the housing and lock plug are rotatable relative to one another, forming a base to which the housing and lock plug are connected from a thermoplastic composition capable of partial dissolution in the selected solvent, affixing a blocker lug in a rotatable relationship relative to the base, positioning the base proximate to the access aperture on the computer data drive, applying the selected solvent to the surface of the base abutting the computer data drive and to the computer data drive, and screwing the base onto the computer data drive where the base is partially amalgamated with the computer data drive via the solvent and is mechanically affixed to the data drive by the screw, and rotating the blocker lug to block the data drive aperture.

BRIEF DESCRIPTION OF THE DRAWINGS

FIG. 1 is an exploded view of an illustrated embodiment of the invention.

FIG. 2 is a front view of the illustrated embodiment attached to a computer.

FIG. 3 is a side view of an alternative embodiment with a spacer.

FIG. 4 is a perspective view of an alternate embodiment of the invention.

DETAILED DESCRIPTION OF THE ILLUSTRATED EMBODIMENT

Blocking device 10, represented in an exploded format in FIG. 1, includes as major components base 12, lock plug 14 and rotatable blocker housing 16. Base 12 and blocker housing 16 are formed from molded polymeric resins, polycarbonates, high impact styrene, and the like, or machined metal.

Base 12 features screw hole 18 incorporating recessed flange 20 sized to receive the shaft of conventional self-tapping screw 22 and dimensioned to allow the screw head to recess therein to secure the base to the computer bezel. Base 12 is adapted to be mounted in close proximity to the diskette slot (see FIG. 2) either vertically or horizontally and features cylindrical bore 24 and superficial recess 26 configured to receive stop washer 28. On the opposite face of base 12 is an opening (not illustrated) configured to receive and fully recess lock washer 30 and threaded nut 32 which allows base 12 to mount flush against the computer. When construed of appropriate resin, base 12 permits solvent bonding to the computer. Since most thermoplastics employed in computer constructing are soluble in solvents such as Methyl Ethyl Ketone (MEK) or Trichloroethylene, selection of a similarly soluble thermoplastic for base 12 can be advantageous. Suitable thermoplastics are ABS - polycarbonate blends, polyphenylene oxide (PPO), high impact styrene, etc. Before mounting base 12 to the computer, a drop or two of appropriate solvent is placed on the computer face and base 12 just prior to pressure contact being made.

Blocker housing 16, as noted above, is generally formed of molded polymeric resin. It has been found that a high lubricity resin is beneficial to prevent frictional wear during use. A high strength resin suitable for construction of housing 16 is an ABS-polycarbonate blended resin such as Bayblend FR 1441 available from Mobay Chemical Company. Housing 16 is of a generally cylindrical configuration with blocking lug 34 projecting from the cylindrical body. Blocking lug 34 is dimensioned to extend a sufficient distance from housing 16 to block the diskette drive when properly mounted and rotated into the blocking position. Blocking lug 34 also features hole 35 to attach decorative "delta" panel 36 and may be tapered to resist being cut off with a pair of wire snips. The interior of cylindrical base 40 features four axially extending grooves 38 spaced equidistantly within the bore. While only one or two are used in any one arrangement, as explained below, the additional grooves permit positioned convertibility of the device. The diameter of bore 40 corresponds to the outer diameter of lock plug 14 so lock plug 14 can be journalled within bore 40.

Lock plug 14 is key actuated (as illustrated) but may also feature a combination type lock, etc. The 3, 4, or 5 pin tumbler cam locks available from Medeco Security Locks, Inc. of Salem, Virginia are eminently suitable for use with this invention. Lock plug 14 features radially extendible and retractable lock pins 15 which retract upon insertion of the key thus allowing for rotation of blocker housing 16 relative to lock plug 14. When unretracted, the pins lodge within grooves 38 to prevent such rotation. Projecting behind lock plug 14 is shaft 17 which has a non-circular cross-section (in this case oblong) so as to coact with the complimentarily shaped aperture in stop washer 28 and has a length sufficient to extend into base 12. The H-Shape is illustrated as the preferenced embodiment since it provides maximum anti-rotational surface-contact resistance between washer 28 and base 12. The irregular cross-sectional configuration is important where combination of shaft 17 and stop washer 28 permits the installer to particularly align and positionally fix lock plug 14 and housing 16 relative to base 12 so the base can be mounted vertically or horizontally relative to the disk slot.

The assembly of blocking device 10 requires insertion of plug 14 into housing 16, passing shaft 17 through the aperture in stop washer 28, through hole 24 and lock washer 30, and, finally, screwing nut 32 onto the end of shaft 17. Consequently, lock plug 14, rotatable housing 16 and base 12 become a single unit. Blocking device 10 is assembled on the computer by selecting the desired position of the blocking device, partially tapping out a hole in the face, passing screw 22 through hole 18 in base 12 into the computer bezel to the depth where the head of screw 22 rests on flange 20. Once properly seated, a drop of appropriate adhesive is placed on the heads of screw 22 and plug 42, dimensioned to correspond to the diameter and remaining depth of hole 18 is pushed into the hole. The adhesive bonds plug 42 to base 12. Also, as noted above, prior to final tightening of blocking device 10 on the computer face, an appropriate solvent or an appropriate adhesive such as epoxy is applied to the back of base 12. This installation provides the added confidence of a "glue and screw" attachment.

The final assembly is illustrated in FIG. 2 as conventionally mounted in a horizontal position under the disk drive slot. The direction of rotation of blocker housing 16 and projecting lug 34 is indicated by the arrow. The advantage of having the one end of base 12 rounded may be discerned from the final assembly. In essence, housing 16 and blocking lug 34 may be "rotated" 180° relative to base 12 to permit left or right mounting on the bezel of the computer. This feature coupled with the four grooves 38 and the configuration of stop washer 28 allows for customizing the position of blocker 10 on the computer bezel.

In FIG. 3, alternative blocking device 50 is illustrated. Blocking device 50 features base adapter 44. While having similar peripheral dimensions to base 12, it features screw hole 46 and also includes locating holes 48. Locating holes 48 are positioned complementary to locating pins 54 located on the backside of base 12 to facilitate alignment and bonding via solvent or adhesive of adapter 44 on base 12. The use of adapters allows base 12 to be elevated at any desired distance from the bezel and is especially useful where the bezel features a substantial protruding lip. Like base 12, adapter 44 features a rounded end to permit rotation of blocking lug and housing for customized mounting. Finally, projecting flange 52 on base 12 can be configured to flush mount on a particular diskette drive slot lip.

FIG. 4 depicts alternate embodiment 60 mounted on computer diskette drive 62. In this embodiment, base 64 is screwed onto the side of drive 62 and lock plug 66 rotates relative to drive 62 and housing 68. Contained within housing 68 and connected to plug 66 is blocker 70 which rotates relative to housing 68 upon rotation of lock plug 66. When so rotated, locking bar 72 assumes the drive slot blocking position.

This invention generally employed in conjunction with the default external boot diskette drive, may be employed effectively with any number of other security devices such as access-restricting software and the like.

Given the foregoing, modifications and variations of the invention should now be evident to the person of ordinary skill in the art. Such modifications and variations are intended to fall within the spirit and scope of this invention as defined by the following claims.

We claim:

1. A device for external attachment to a computer diskette drive having a slotted aperture, comprising:
    a base having a first and second surfaces including a first aperture and a second aperture extending therethrough, said first aperture featuring a recessed flange and dimensioned to receive a screw and said second aperture being surrounded by a recess on said first surface dimensioned to receive a stop washer of a desired configuration, and a recessed flange formed in said second surface dimensioned to receive a nut,
    a rotatable blocking means for blocking the diskette drive when rotated from an unblocking position to a blocking position, said blocking means having a cylindrical core with axially extending grooves,
    a lock plug featuring retractable pins, and a shaft of non-circular cross-sectional dimensions, said lock plug being positionable in the core of said blocking means and said shaft extending through said blocking means,
    a stop washer of desired configuration to correspond to said recess, and having an aperture of corresponding dimensions to the cross-section of said shaft,
    a nut dimensioned to attach to said shaft where said shaft extends through said stop washer and is attached to said base with said nut,
    a screw for passing through said first aperture and dimensioned to pass into the computer, and a plug dimensioned to fit into said first aperture over said screw.

2. A method for retrofitting a blocking device for computer data drive access aperture, comprising the steps of:

selecting a solvent capable of dissolving the thermoplastic composition of the computer data drive, forming a housing containing a key-actuated lock plug where the housing and lock plug are rotatable relative to one another, forming a base to which the housing and lock plug are connected from a thermoplastic composition capable of partial dissolution in the selected solvent, affixing a blocker lug in a rotatable relationship relative to the base, positioning the base proximate to the access aperture on the computer data drive, applying the selected solvent to the surface of the base abutting the computer data drive and to the computer data drive, and screwing the base onto the computer data drive where the base is partially amalgamated with the computer data drive via the solvent and is mechanically affixed to the data drive by the screw, and rotating the blocker lug to block the data drive aperture.

3. A device for external attachment to a computer diskette drive having a slotted aperture, comprising:

a base having a first and second surfaces including a first aperture being surrounded by a recess on said first surface dimensioned to receive a stop washer of a desired configuration, and a recessed flange formed in said second surface dimensioned to receive a nut, a rotatable blocking means for blocking the diskette drive when rotated from an unblocking position to a blocking position, said blocking means having a cylindrical core with axially extending grooves, a lock plug featuring retractable pins, and a shaft of non-circular cross-sectional dimensions, said lock plug being positionable in the core of said blocking means and said shaft extending through said blocking means, a stop washer of desired configuration to correspond to said recess, and having an aperture of corresponding dimensions to the cross-section of said shaft, and a nut dimensioned to attach to said shaft where said shaft extends through said stop washer and is attached to said base with said nut.

4. A device according to claim 3 where the base is comprised of a polymer selected from the group consisting of polycarbonate blends, polyphenylene oxide, and high impact polystyrene to permit solvent bonding to a computer drive.

5. A device according to claim 3 where the base includes a second aperture and further comprising attachment means for attaching said aperture to the computer by extending through said second aperture.

6. A device according to claim 5 where said attachment means is a screw.

7. A method for retrofitting a blocking device for computer data drive access aperture, the blocking device including a housing containing a key-actuated lock plug where the housing and lock plug are rotatable relative to one another, a base to which the housing and lock plug are connected, and a blocker lug rotatable relative to the base, comprising the steps of:

positioning the base proximate to the access aperture on the computer data drive, choosing a material selected from the group consisting of an epoxy adhesive and a solvent capable of dissolving the thermoplastic composition of the computer data drive, applying the selected material to the surface of the base abutting the computer data drive, to mechanically affix the blocking device to the commuter data drive, and rotating the blocker lug to block the data drive aperture.

* * * * *